US012633019B2

(12) United States Patent
Chong et al.

(10) Patent No.: US 12,633,019 B2
(45) Date of Patent: May 19, 2026

(54) SYSTEM OF GENERATING DATA FROM DIFFUSION-WEIGHTED IMAGES FOR PRE-PROCESSING AND METHOD THEREOF

(71) Applicant: NATIONAL YANG MING CHIAO TUNG UNIVERSITY, Hsinchu City (TW)

(72) Inventors: Shin Tai Chong, Hsinchu City (TW); Chih-Chin Hsu, Hsinchu City (TW); Yi-Chia Kung, Hsinchu City (TW); Kuan-Tsen Kuo, Hsinchu City (TW); Chu-Chung Huang, Hsinchu City (TW); Ching-Po Lin, Hsinchu City (TW)

(73) Assignee: NATIONAL YANG MING CHIAO TUNG UNIVERSITY, Hsinchu City (TW)

( * ) Notice: Subject to any disclaimer, the term of this patent is extended or adjusted under 35 U.S.C. 154(b) by 380 days.

(21) Appl. No.: 18/232,293

(22) Filed: Aug. 9, 2023

(65) Prior Publication Data

US 2024/0290013 A1      Aug. 29, 2024

(30) Foreign Application Priority Data

Feb. 28, 2023    (TW) ................................. 112104371

(51) Int. Cl.
*G06T 12/10* (2026.01)
*G06T 5/70* (2024.01)
(Continued)

(52) U.S. Cl.
CPC ................ *G06T 12/10* (2026.01); *G06T 5/70* (2024.01); *G06T 7/0012* (2013.01); *G06T 7/30* (2017.01);
(Continued)

(58) Field of Classification Search
CPC ....... G06T 11/005; G06T 5/70; G06T 7/0012; G06T 7/30; G06T 11/008;
(Continued)

(56) References Cited

PUBLICATIONS

Brun L, Pron A, Sein J, Deruelle C, Coulon O. Diffusion MRI: Assessment of the Impact of Acquisition and Preprocessing Methods Using the BrainVISA-Diffuse Toolbox. Front Neurosci. Jun. 7, 2019;13:536. doi: 10.3389/fnins.2019.00536. PMID: 31275091; PMCID: PMC6593278. (Year: 2019).*

(Continued)

*Primary Examiner* — Vincent Rudolph
*Assistant Examiner* — Keely Gwynne Yeargin
(74) *Attorney, Agent, or Firm* — Chih Feng Yeh; Yongjean Consulting Inc.

(57) ABSTRACT

A system of generating data from diffusion-weighted images for pre-processing and a method thereof are disclosed. In the system, a processing parameter set including diffusion information is acquired; after a raw diffusion-weighted image including data images and image information is acquired, the image information is interpreted to set image processing data of the raw diffusion-weighted image, and non-deformation correction and deformation correction are performed on the raw diffusion-weighted image to generate a pre-processed diffusion-weighted image based on the processing parameter set and the image processing data. Therefore, the image processing data can be automatically set based on the raw diffusion-weighted image, to achieve the effect of lowering difficulty for analyzing DWI and saving setup time of image processing data.

14 Claims, 9 Drawing Sheets

(51) Int. Cl.
    *G06T 7/00*         (2017.01)
    *G06T 7/30*         (2017.01)
    *G06T 12/30*       (2026.01)

(52) U.S. Cl.
    CPC .... *G06T 12/30* (2026.01); *G06T 2207/10092*
        (2013.01); *G06T 2207/20212* (2013.01); *G06T*
           *2207/30016* (2013.01); *G06T 2207/30168*
                              (2013.01)

(58) Field of Classification Search
    CPC . G06T 2207/10092; G06T 2207/20212; G06T
           2207/30016; G06T 2207/30168; G06T
                            5/50; G06T 5/60
    See application file for complete search history.

(56) References Cited

PUBLICATIONS

Oguz I, Farzinfar M, Matsui J, Budin F, Liu Z, Gerig G, Johnson HJ, Styner M. DTIPrep: quality control of diffusion-weighted images. Front Neuroinform. Jan. 30, 2014;8:4. doi: 10.3389/fninf.2014. 00004. PMID: 24523693; PMCID: PMC3906573. (Year: 2014).*

Cai LY, et al. PreQual: An automated pipeline for integrated preprocessing and quality assurance of diffusion weighted MRI images. Magn Reson Med. Jul. 2021;86(1):456-470. doi: 10.1002/mrm.28678. Epub Feb. 3, 2021. PMID: 33533094; PMCID: PMC8387107. (Year: 2021).*

Usman M, Kakkar L, Kirkham A, Arridge S, Atkinson D. Model-based reconstruction framework for correction of signal pile-up and geometric distortions in prostate diffusion MRI. Magn Reson Med. Mar. 2019;81(3):1979-1992. doi: 10.1002/mrm.27547. Epub Nov. 4, 2018. PMID: 30393895; PMCID: PMC6492108. (Year: 2018).*

Hutchinson EB, et al. Analysis of the effects of noise, DWI sampling, and value of assumed parameters in diffusion MRI models. Magn Reson Med. Nov. 2017;78(5):1767-1780. doi: 10.1002/mrm.26575. Epub Jan. 16, 2017. PMID: 28090658; PMCID: PMC6084345. (Year: 2017).*

Hsu CH, Chong ST, Kung YC, Kuo KT, Huang CC, Lin CP. Integrated diffusion image operator (iDIO): A pipeline for automated configuration and processing of diffusion MRI data. Hum Brain Mapp. May 2023;44(7):2669-2683. doi: 10.1002/hbm.26239. Epub Feb. 21, 2023. PMID: 36807461; PMCID: PMC10089090. (Year: 2023).*

Y. Zhao et al., "Localized Motion Artifact Reduction on Brain MRI Using Deep Learning with Effective Data Augmentation Techniques," 2021 International Joint Conference on Neural Networks (IJCNN), Shenzhen, China, 2021, pp. 1-9, doi: 10.1109/IJCNN52387. 2021.9534191. (Year: 2021).*

K. Tartarotti Nepomuceno Duarte, et al., "Brain Extraction in Multiple T1-weighted Magnetic Resonance Imaging slices using Digital Image Processing techniques," in IEEE Latin America Transactions, vol. 20, No. 5, pp. 831-838, May 2022, Electronically Pub. Jan. 26, 2022,doi: 10.1109/TLA.2022.9693568. (Year: 2022).*

Roujol S, Foppa M, Weingärtner S, Manning WJ, Nezafat R. Adaptive registration of varying contrast-weighted images for improved tissue characterization (ARCTIC): application to T1 mapping. Magn Reson Med. Apr. 2015;73(4):1469-82. doi: 10.1002/mrm.25270. Epub May 5, 2014. PMID: 24798588; PMCID:PMC4221574 (Year: 2015).*

* cited by examiner

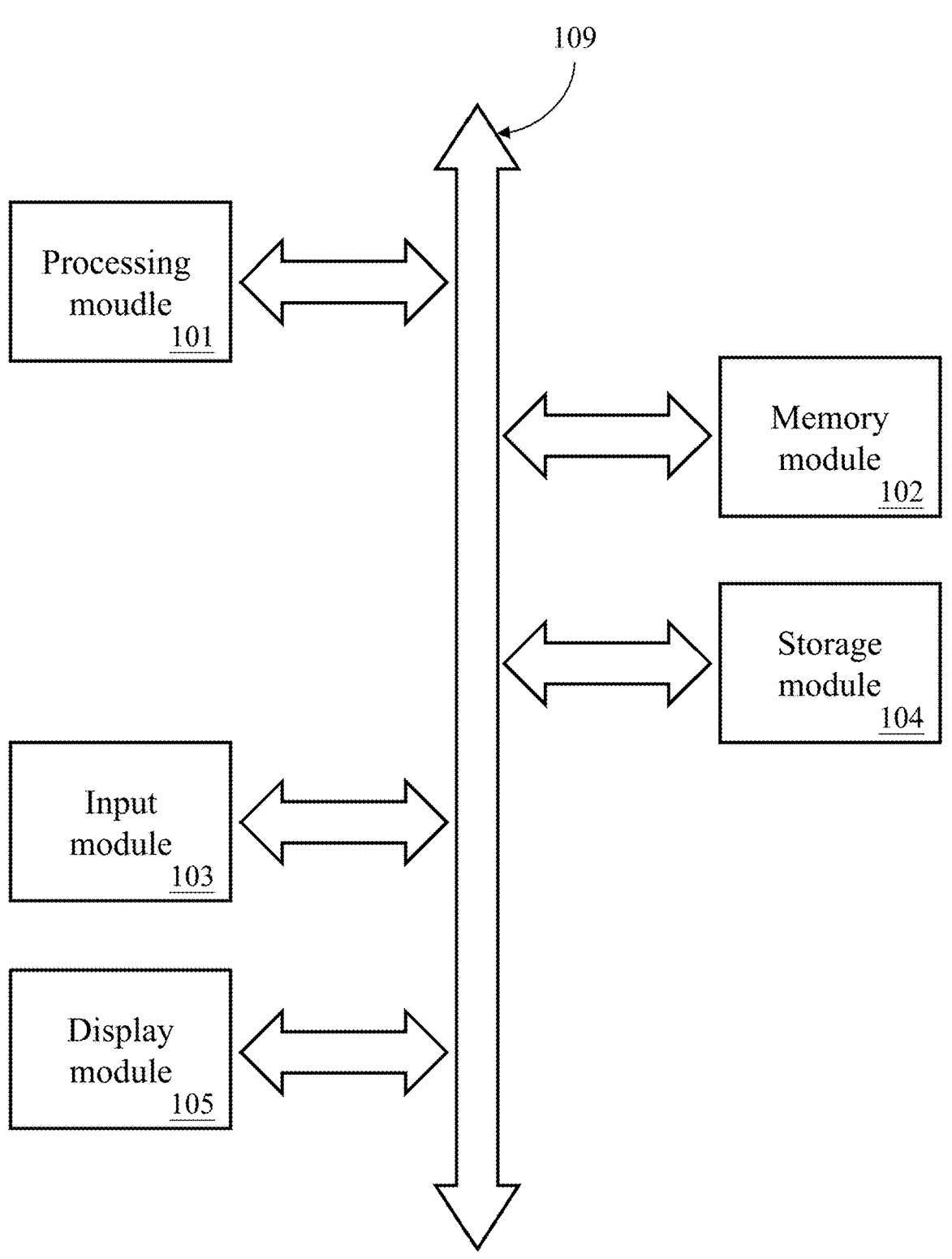
【FIG. 1A】

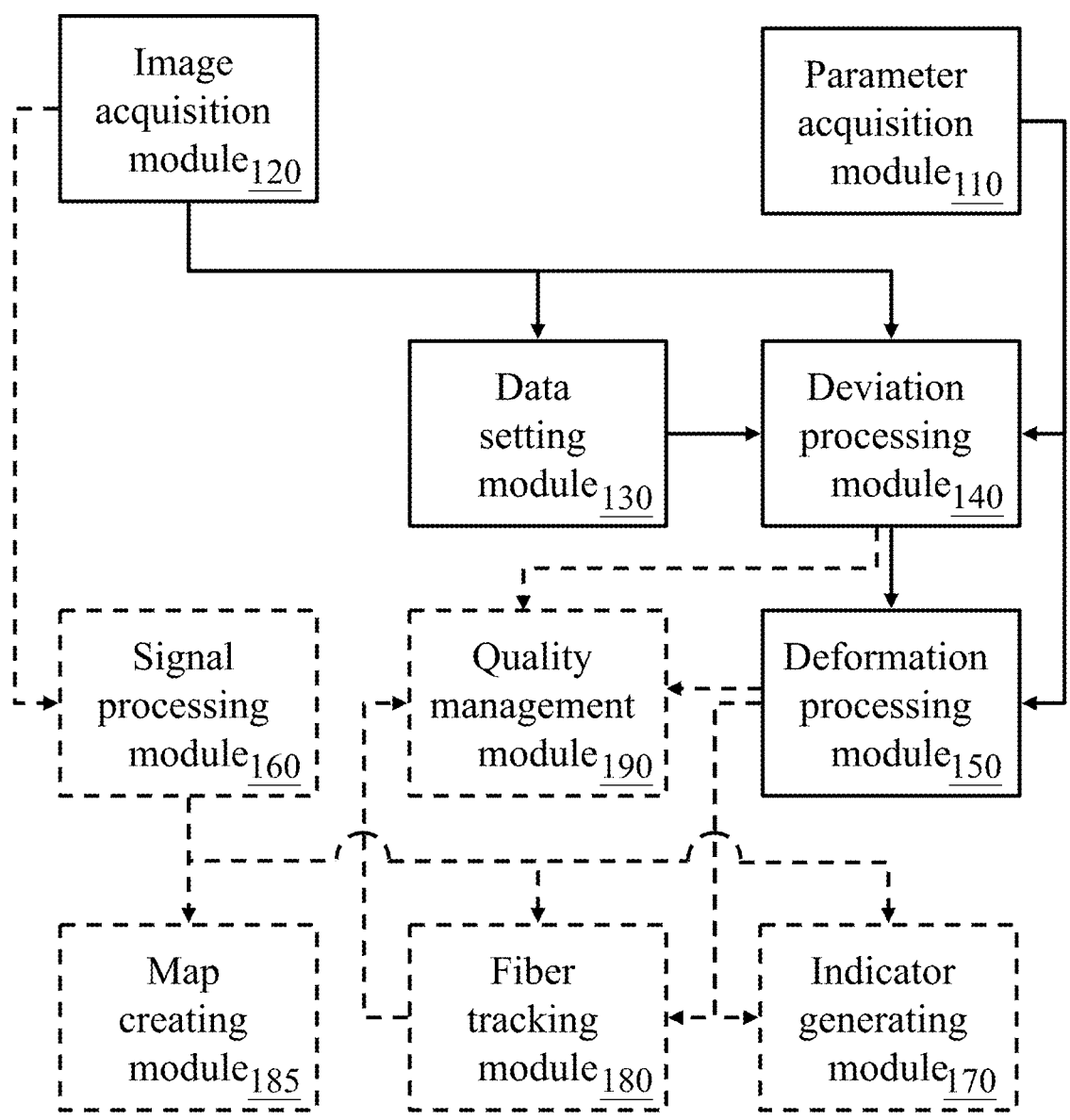
【FIG. 1B】

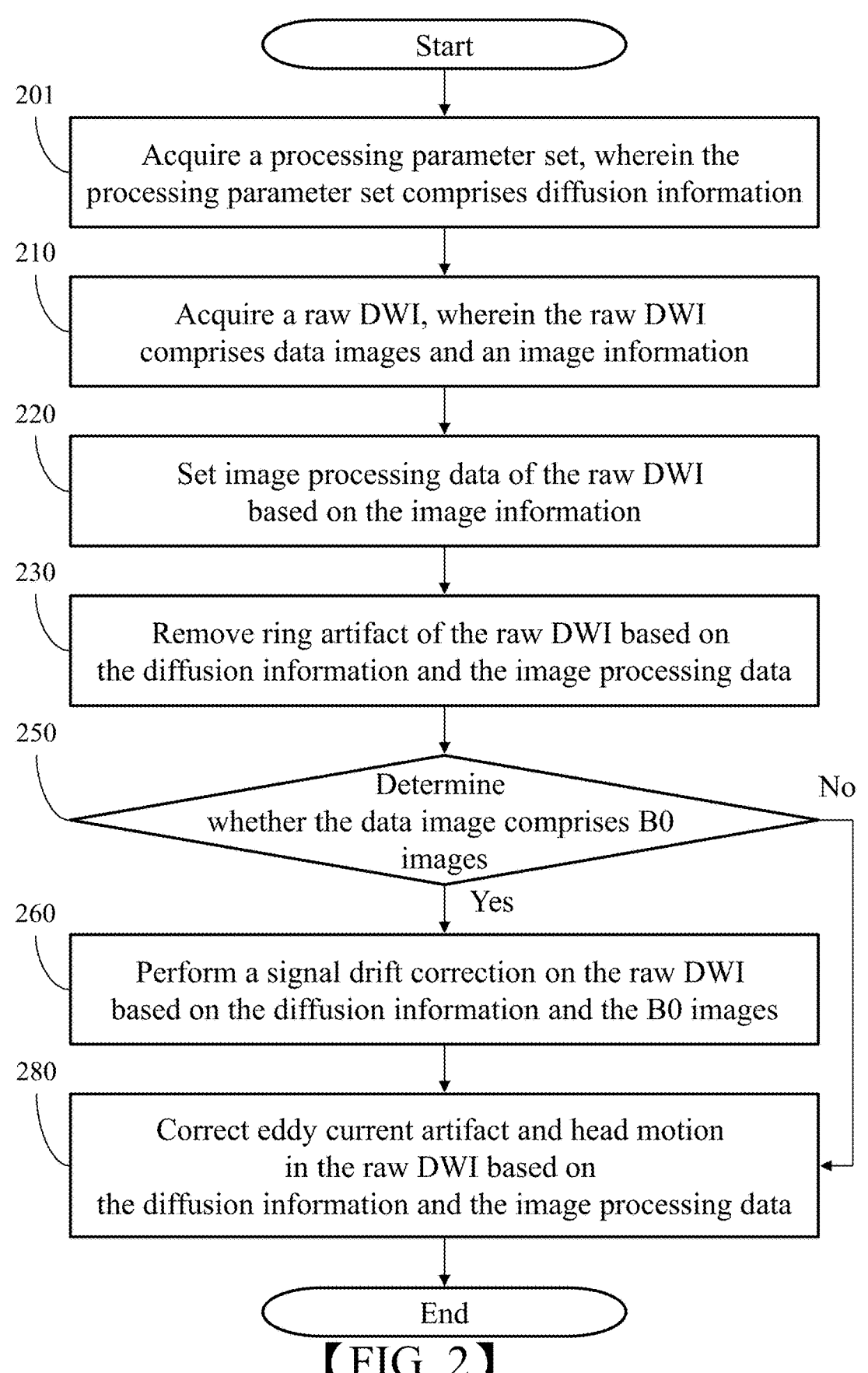
【FIG. 2】

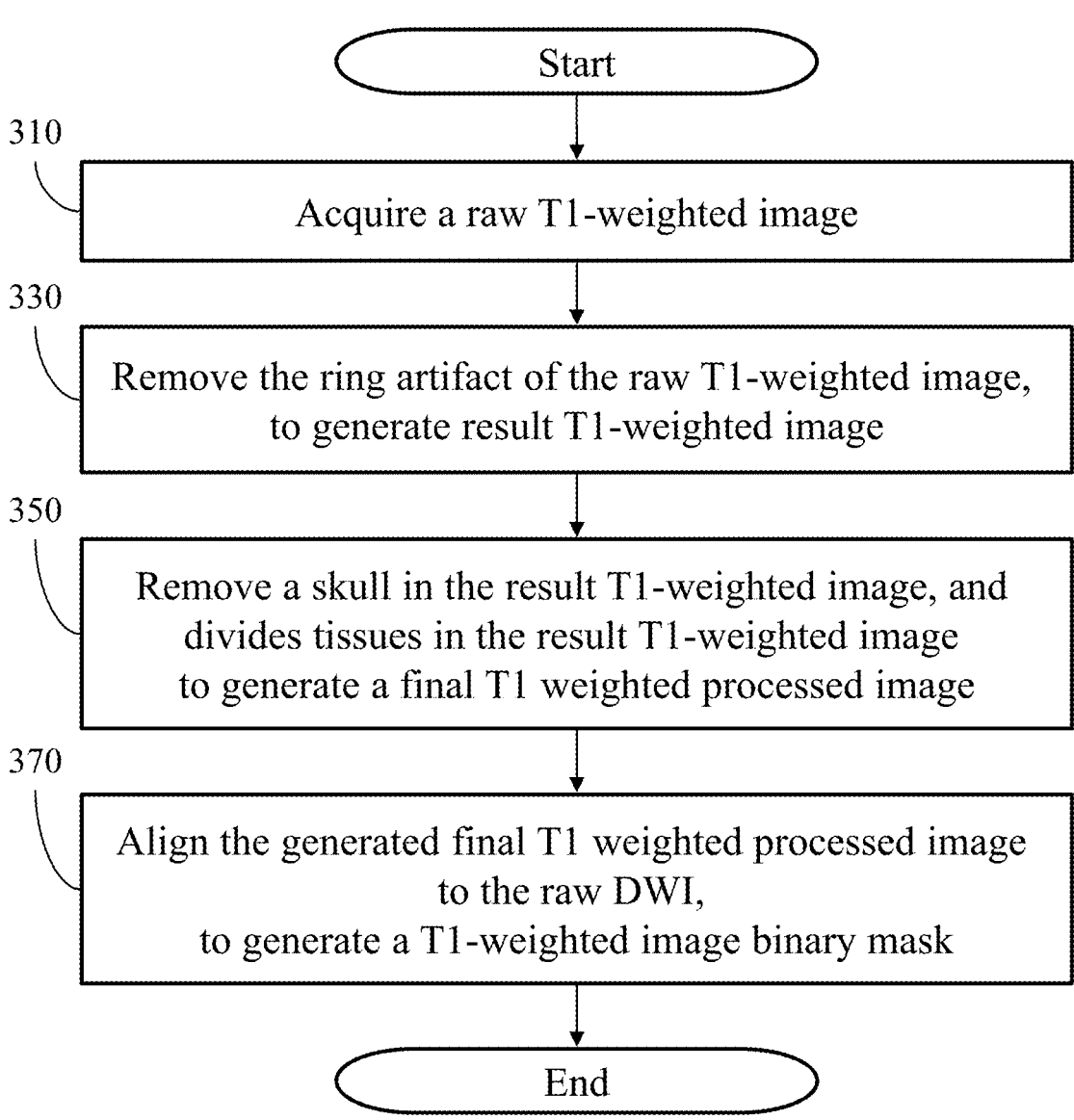
【FIG. 3】

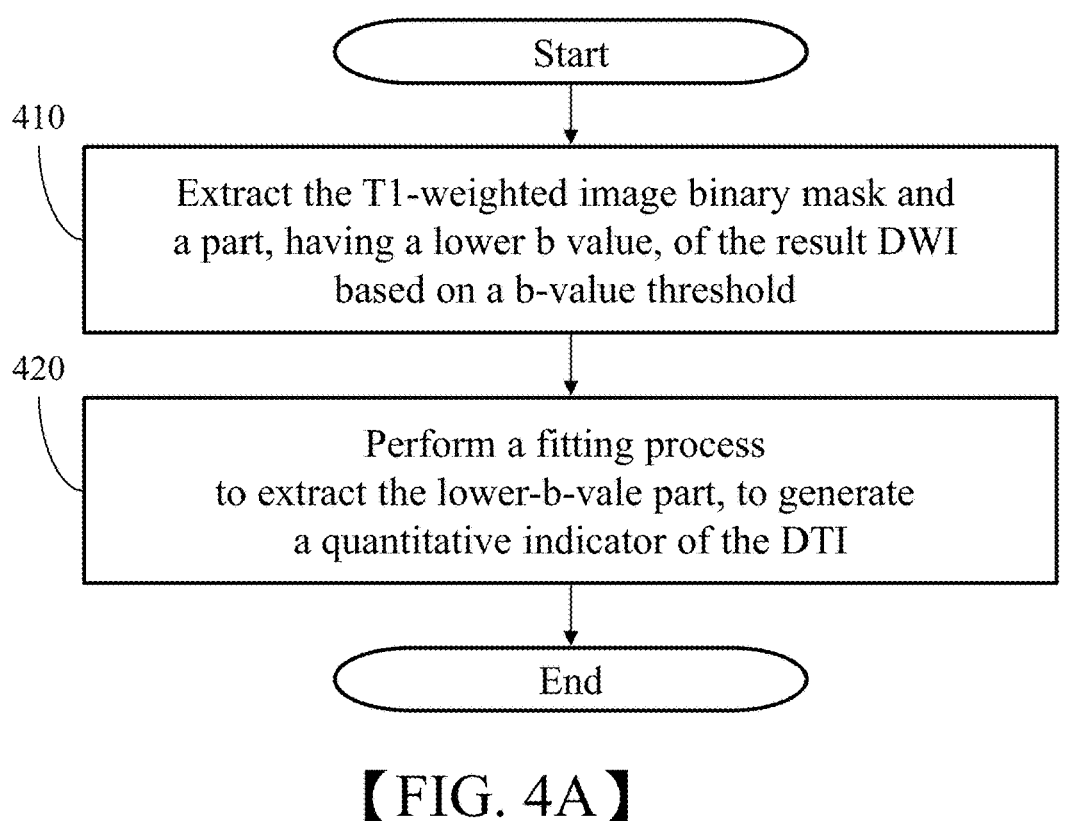
[FIG. 4A]
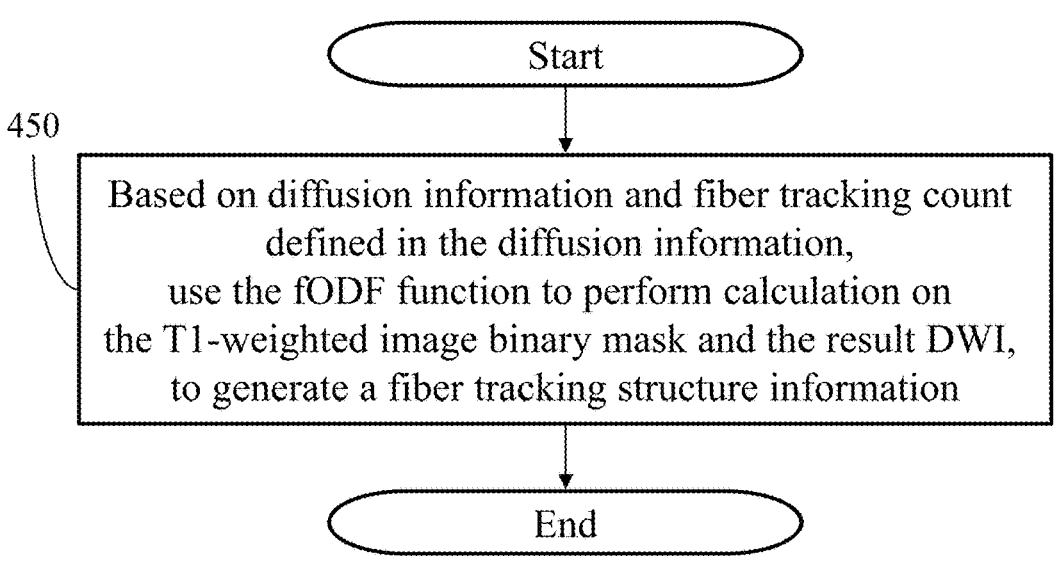
[FIG. 4B]

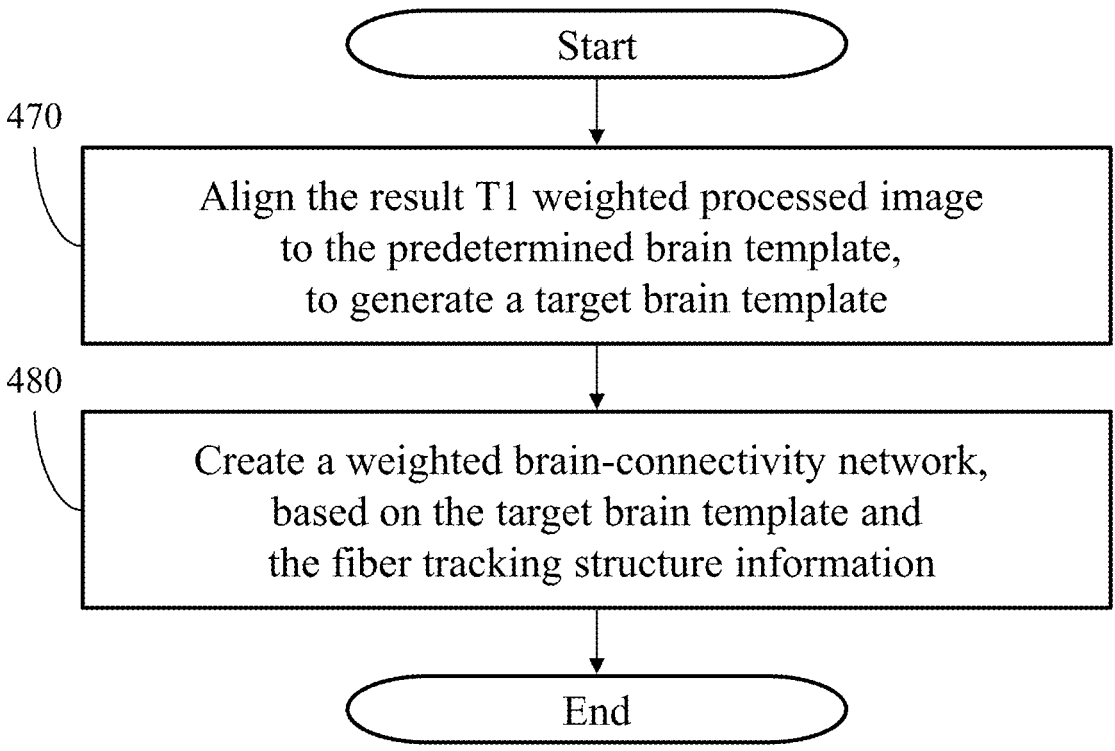
470
480
[FIG. 4C]

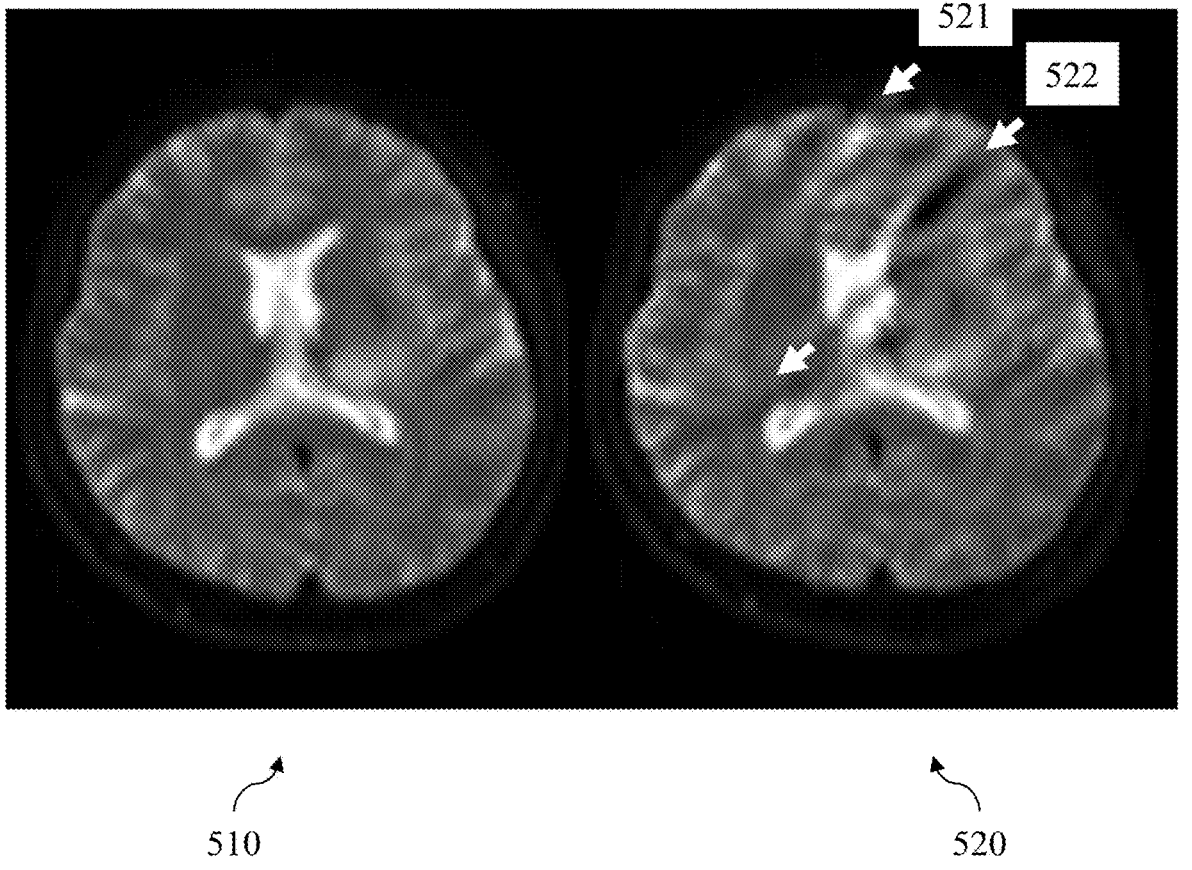
【FIG. 5】

610

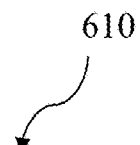

(A)

DIO v1.0 QC report

Warning :
× Caution for Gibbs ringing removal : partial Fourier acquisition may lead to suboptimal results, please check corrected output images and use it with caution.
× Outliers detected ( > 5% in z – axis,  2.78% in 180 non – zero volumes : )
        4 out of 72 slices shown as outliers in volume 13
        4 out of 72 slices shown as outliers in volume 21
        4 out of 72 slices shown as outliers in volume 37
        5 out of 72 slices shown as outliers in volume 40
        4 out of 72 slices shown as outliers in volume 53

Methods Summary :
▶ The diffusion data were processed with DIO toolbox : its functionalities come from MRtrix3 (https://www.mrtrix.org/), FSL (https://fsl.fmrib.ox.ac.uk/), ANTs (http://stnava.github.io/ANTs/), and PreQual (https://github.com/MASILab/PreQual)  software packages [1, 2, 3, 4].
▶ Signal denoising : using dwidenoise (MRtrix3 command) based on random matrix with patch-level Marchenko-Pastur PCA method [5, 6, 7].
▶ Gibbs ringing removal : using mrdegibbs (MRtrix3 command) with local subvoxel-shifts method [8].
▶ Signal drift correction : using linear correction adopted from the released script by Vos S.B [9].
▶ Susceptibility – induced distortion, eddy current, and subject movement correction : using topup and eddy (FSL commands) [10, 11, 12].
▶ Within – volume (slice – to – volume) movement were considered : using – – mporder (FSL eddy option) [13].
▶ B1 field inhomogeneity correction : using dwibiascorrect (MRtrix3 command) with ants option [14].
▶ T1W image preprocessing : Gibbs ringing removal (mrdegibbs MRtrix3 command), B1 field inhomogeneity correction (N4BiasFieldCorrection ANTs command), and five-tissue type (5tt) segmentation (including cortical gray matter, subcortical gray matter, white matter, cerebrospinal fluid and pathological tissue, 5ttgen MRtrix3 command with fsl option) [8, 14, 15].
▶ T1W image registratered with b0 image : T1W image mask were registered to b0 as analysis mask using boundary-based registration with the segmented white matter (BBR FSL command) to generate the transformation matrix from Diffusion-space to T1-space [16, 17].
▶ Diffusion Tensor Image estimation : quantitative indices of fractional anisotropy, axial diffusivity, mean diffusivity and radial diffusion maps were calculated using dtifit (FSL command).
▶ Fiber orientation density function (FODF) estimation : using a multi-shell multi-tissue constrained spherical deconvolution model with the prior co-registered 5tt image (using dwi2fod MRtrix3 command) [18].
▶ ODF with multi – tissue informed log – domain intensity normalization : using mtnormalise (MRtrix3 command) [19, 20].
▶ White matter tractography : fiber tracking were performed based on the voxel-wise FODF using anatomically constrained tractography with dynamic seeding (tckgen algorithm and the spherical-deconvolution informed weighted of tractogram were applied. These could be achieved by using tckgen and tcksift2) (MRtrix3 commands) [21, 22].
▶ Connectivity matrices reconstruction : AAL3 [23], HCPMMP [24], HCPex [25], Yeo 400 [26] atlases were utilized to generate the connectivity matrices. To transform the atlases from MNI standard space to the individual native space, T1 image was spatially normalized to the nonlinear ICBM152 template using antsRegistrationSyNQuick (ANTs commands) [27].

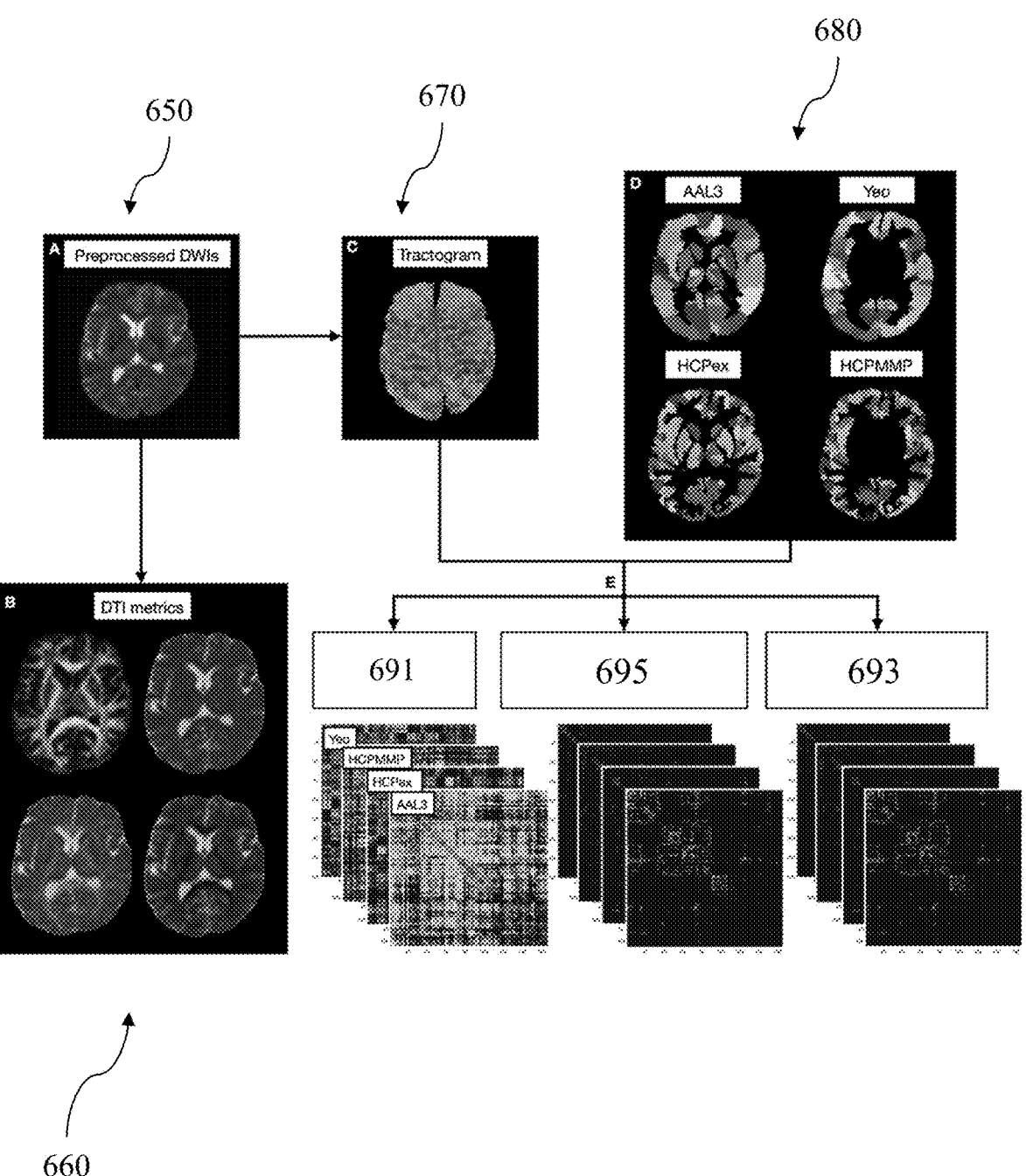
【FIG. 6B】

SYSTEM OF GENERATING DATA FROM DIFFUSION-WEIGHTED IMAGES FOR PRE-PROCESSING AND METHOD THEREOF

CROSS-REFERENCE STATEMENT

The present application is based on, and claims priority from, TAIWAN Patent Application Serial Number 112104371, filed Feb. 28, 2023, the disclosure of which is hereby incorporated by reference herein in its entirety.

BACKGROUND

1. Technical Field

The present invention is related to a system of pre-processing diffusion-weighted images and a method thereof, and particularly to a system of generating data from diffusion-weighted images for pre-processing and a method thereof.

2. Description of Related Arts

Diffusion magnetic resonance imaging (also known as diffusion MRI or dMRI) technology is to measure the displacement generated by the Brownian motion of water molecules through rapid imaging technology to explore the fine structure in human tissue, and it is often used in clinical diagnosis and scientific research. Water molecules are the main constituents in biological tissues; in nerve fibers, the diffusion displacement of water molecules along the orientation of nerve fibers becomes longer with the increase of diffusion time, and the water molecules in the orientation perpendicular to the nerve fibers are affected by cell membrane and nerve myelin sheath limit, and such differences cause the diffusion probability distribution of water molecules to reflect the fine structure of nerve fibers that includes sizes and orientations of nerve fibers. And, using such characteristics, currently the orientations of nerve fibers in tissues can be measured by only using diffusion-weighted imaging (DWI) technology.

However, the diffusion-weighted image generated by the diffusion-weighted imaging technique usually needs to be pre-processed before it is used; for example, the pre-processing may include noise removal, ring artifact removal, signal drift correction, magnetic susceptibility distortion correction, eddy current artifact correction, head motion correction, or bias field correction. Researchers or clinicians usually configure different image pre-processing steps according to different image acquisition schemes, different image pre-processing steps (such as different process sequence or different analysis parameters) may produce different processing results, resulting in differences in data processing methods, thereby reducing comparability between studies. As a result, the technical threshold for non-experts to analyze diffusion-weighted image is increased.

In addition, the pre-processing steps for diffusion-weighted image need a user to manually set the image processing data, but the image processing data has more and complicated items, so the user often needs to spend more time to set data but it is often possible to set wrongly; when the user inputs the image processing data incorrectly, it will cause abnormality when the pre-processed diffusion-weighted image is subsequently used to determine the orientation of the brain nerve fibers, resulting in a waste of time.

Therefore, according to above-mentioned contents, what is needed is to develop an improved solution to solve the above-mentioned conventional problem that the technical threshold of diffusion-weighted image pre-processing is high and the pre-processing image processing data may be wrongly inputted by the user to result in abnormal results.

SUMMARY

An objective of the present invention is to disclose a system of generating data from diffusion-weighted images for pre-processing and a method thereof, to solve the conventional problem that the technical threshold of diffusion-weighted image pre-processing is high and the pre-processing image processing data may be wrongly input by the user to result in abnormal results.

In order to achieve the objective, the present invention discloses a system of generating data from diffusion-weighted images for pre-processing, and the system includes a parameter acquisition module, an image acquisition module, a data setting module, a deviation processing module, and a deformation processing module. The parameter acquisition module is configured to acquire a processing parameter set, wherein the processing parameter set comprises diffusion information. The image acquisition module is configured to acquire a raw diffusion-weighted image, wherein the raw diffusion-weighted image comprises data images and image information. The data setting module is configured to set image processing data of the raw diffusion-weighted image based on the image information. The deviation processing module is configured to remove ring artifact of the raw diffusion-weighted image based on the diffusion message data and the image processing data, wherein when determining that the data images comprise B0 images, the deviation processing module performs a signal drift correction on the raw diffusion-weighted image based on the diffusion information and the B0 images. The deformation processing module is configured to correct eddy current artifacts and head motion of the raw diffusion-weighted image processed by the deviation processing module, based on the diffusion information and the image processing data.

In order to achieve the objective, the present invention discloses a method of generating data from diffusion-weighted images for pre-processing, and the method includes steps of: acquiring a processing parameter set, wherein the processing parameter set comprises diffusion information; acquiring a raw diffusion-weighted image (DWI), wherein the raw diffusion-weighted image comprises data images and an image information; setting image processing data of the raw diffusion-weighted image based on the image information; performing following steps on the raw diffusion-weighted image to generate a result diffusion-weighted image: removing ring artifact of the raw diffusion-weighted image based on the diffusion information and the image processing data; when the data images are determined to comprise B0 images, performing a signal drift correction on the raw diffusion-weighted image based on the diffusion information and the B0 images; and correcting eddy current artifact and a head motion in the raw diffusion-weighted image based on the diffusion information and the image processing data.

According to the above-mentioned system and method of the present invention, the difference between the present invention and the conventional technology is that, in the present invention, the processing parameter set including diffusion information is acquired; after the raw diffusion-weighted image including data images and image information is acquired, the image information is interpreted to set image processing data of the raw diffusion-weighted image, and non-deformation correction and deformation correction are performed on the raw diffusion-weighted image to generate the pre-processed diffusion-weighted image based on the processing parameter set and the image processing data. Therefore, the above-mentioned solution of the present invention is able to solve the conventional problem, so as to achieve the effect of lowering threshold for data analysis and saving setup time of image processing data.

BRIEF DESCRIPTION OF THE DRAWINGS

The structure, operating principle and effects of the present invention will be described in detail by way of various embodiments which are illustrated in the accompanying drawings.

FIG. 1A is a structural view of a system of generating data from diffusion-weighted images for pre-processing, according to the present invention.

FIG. 1B is a schematic diagram of a processing module, according to the present invention.

FIG. 2 is a flowchart of a method of generating data from diffusion-weighted images for pre-processing, according to the present invention.

FIG. 3 is a flowchart of a pre-process performed on a T1 weighted image, according to the present invention.

FIG. 4A is a flowchart of generating a quantitative indicator of a diffusion tensor image, according to the present invention.

FIG. 4B is a flowchart of generating a fiber tracking structure information, according to the present invention.

FIG. 4C is a flowchart of setting up a weighted brain-connectivity network of the present invention.

FIG. 5 is a schematic view of an embodiment of a diffusion-weighted image after a magnetic susceptibility distortion correction, according to the present invention.

FIG. 6A is a schematic view of an embodiment of a quality management report, according to the present invention.

FIG. 6B is a schematic view of an embodiment of a quality management report, according to the present invention.

DETAILED DESCRIPTION

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

As used herein, the term "or" includes any and all combinations of one or more of the associated listed items. It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The technical solution of the present invention can automatically interpret content of a diffusion-weighted image to pre-process the diffusion-weighted image for further use; for example, the pre-processed diffusion-weighted image can be used to create a diffusion tensor image (DTI) model, and/or a constrained spherical deconvolution (CSD) model, and even a fiber tracking and/or brain connectivity map.

The computing apparatus mentioned in the present invention includes, but not limited to, one or more processing modules, one or more memory modules, and a bus connected to hardware components (including memory modules and processing modules). Through the above-mentioned hardware components, the computing apparatus can load and execute the operating system, so that the operating system can be executed on the computing apparatus, and can also execute software or programs. In addition, the computing apparatus also includes a housing, and the above-mentioned hardware components are arranged in the housing.

The bus of the computing apparatus mentioned in the present invention may be implemented by one or more types of bus; for example, the bus can include a data bus, an address bus, a control bus, an expansion bus or a local bus. The bus of computing apparatus can include, but not limited to, Industry Standard Architecture (ISA) bus, Peripheral Component Interconnect (PCI) bus, Video Electronics Standards Association (VESA) local bus, Universal Serial Bus (USB), PCI Express (PCI-E/PCIe) bus, etc.

The processing module of the computing apparatus is coupled with the bus. The processing module includes a register group or a register space. The register group or the register space can be completely set on the processing chip of the processing module, or can be all or partially set outside the processing chip and is coupled to the processing chip through dedicated electrical connection and/or a bus. The processing module can be a central processing unit, a microprocessor, or any suitable processing component. If the computing apparatus is a multi-processor apparatus, that is, the computing apparatus includes processing modules, and the processing modules can be all the same or similar, and coupled and communicated with each other through a bus. The processing module can interpret a computer instruction or a series of multiple computer instructions to perform specific operations or operations, such as mathematical operations, logical operations, data comparison, data copy/moving, so as to drive other hardware component, execute the operating system, or execute various programs and/or module in the computing apparatus. The computer instruction may be an assembly instruction, an instruction set architecture (ISA) instruction, a machine instruction, a machine-related instruction, a microcode, a firmware instruction, or a source code or an object code written in any combination of two or more programming languages. And the computer instruction may be executed entirely on a single computing apparatus, partly on a single computing apparatus, or partly on one computing apparatus and partly on another connected computing device. The above-mentioned programming languages include object-oriented programming languages, such as Common Lisp, Python, C++, Objective-C, Smalltalk, Delphi, Java, Swift, C#, Perl, Ruby, etc., and conventional procedural programming languages, such as C language or other similar programming language.

The computing apparatus usually also includes one or more chipsets. The processing module of the computing apparatus can be coupled to the chipset, or electrically connected to the chipset through the bus. The chipset includes one or more integrated circuits (IC) including a memory controller and a peripheral input/output (I/O) controllers, that is, the memory controller and the peripheral input/output controller can be implemented by one integrated circuit, or implemented by two or more integrated circuits. Chipsets usually provide I/O and memory management functions, and multiple general-purpose and/or dedicated-purpose registers, timers. The above-mentioned general-purpose and/or dedicated-purpose registers and timers can be coupled to or electrically connected to one or more processing modules to the chipset for being accessed or used.

The processing module of the computing apparatus can also access the data stored in the memory module and mass storage area installed on the computing apparatus through the memory controller. The above-mentioned memory modules include any type of volatile memory and/or non-volatile memory (NVRAM), such as Static Random Access Memory (SRAM), Dynamic Random Access Memory (DRAM), Read-Only Memory (ROM), or Flash memory. The above-mentioned mass storage area can include any type of storage device or storage medium, such as hard disk drives, optical discs, flash drives, memory cards, and solid state disks (SSD), or any other storage device. In other words, the memory controller can access data stored in static random access memory, dynamic random access memory, flash memory, hard disk drives, and solid state drives.

The processing module of the computing apparatus can also connect and communicate with peripheral devices and interfaces including peripheral output devices, peripheral input devices, communication interfaces, or various data or signal receiving devices through the peripheral I/O controller and the peripheral I/O bus. The peripheral input device can be any type of input device, such as a keyboard, mouse, trackball, touchpad, or joystick. The peripheral output device can be any type of output device, such as a display, or a printer; the peripheral input device and the peripheral output device can also be the same device such as a touch screen. The communication interface can include a wireless communication interface and/or a wired communication interface. The wireless communication interface can include the interface capable of supporting wireless local area networks (such as Wi-Fi, Zigbee, etc.), Bluetooth, infrared, and near-field communication (NFC), 3G/4G/5G and other mobile communication network (cellular network) or other wireless data transmission protocol; the wired communication interface can be an Ethernet device, a DSL modem, a cable modem, an asynchronous transfer mode (ATM)

devices, or optical fiber communication interfaces and/or components. The data or signal receiving device can include a GPS receiver or a physiological signal receiver, and physiological signal received by the physiological signal receiver includes but not limit to heartbeat, blood oxygen, etc. The processing module can periodically poll various peripheral devices and interfaces, so that the computing apparatus can input and output data through various peripheral devices and interfaces, and can also communicate with another computing apparatus having the above-mentioned hardware components.

The operation of the system of the present invention will be illustrated in reference with FIG. 1A, which is a structural view of the system of generating data from diffusion-weighted images for pre-processing. As shown in FIG. 1A, the system includes a processing module 101, a memory module 102, an input module 103, a storage module 104, a display module 105. It should be noted that the processing module 101, the memory module 102, the input module 103, the storage module 104 and the display module 105 could be concentrated in the same device or scatted in different devices. The above-mentioned device(s) can be computer apparatus, that is, one or more devices (computer apparatuses) may implement the system of the present invention. The processing module 101, the memory module 102, the input module 103, the storage module 104, and the display module 105 connects through the bus 109 when the system of the present invention is implemented by one device or connects through wire or wireless technology when the system of the present invention is implemented by two or more devices.

The processing module 101 is configured to execute one or a series (plurality or one or more sets) of computer readable instructions stored in the memory module 102. After the above-mentioned computer readable instructions are executed, the processing module 101 may generate a parameter acquisition module 110, an image acquisition module 120, a data setting module 130, a deviation processing module 140, a deformation processing module 150 shown in FIG. 1B; optionally, the processing module 101 can also generate a signal processing module 160, an indicator generating module 170, a fiber tracking module 180, a map creating module 185, and a quality management module 190.

On the other hand, the processing module 101 may also include entities of the above-mentioned modules (110-190), that is to say, the above-mentioned modules (110-190) may be realized by physical hardware components such as circuits or electronic components or chips, and the processing module 101 is a general term for circuits, electronic components, and chips that implement the above-mentioned modules (110-190). The above-mentioned electronic components include but are not limited to complex programmable logic devices (CPLD), and the above-mentioned chips are, for example, application specific integrated circuits (ASIC), system on chip (SoC), field programmable gate array (FPGA), but the present invention is not limited thereto.

The parameter acquisition module 110 is configured to acquire a processing parameter set. For example, the parameter acquisition module 110 reads a specified file from the storage module 104 to acquire the processing parameter set, or receives the processing parameter set inputted to a command line or a user interface by a user using the input module 103.

The processing parameter set that is acquired by the parameter acquisition module 110 can include one or more processing parameter; for example, a processing parameter can include, but not limited to, an image scanning sequence, a parameter indicating whether to perform signal drift correction, a parameter indicating whether to perform acceleration movement correction, a voxel adjustment value, a diffusion information, a brain template storage path, a parameter indicating whether to perform a bias field correction, a fiber tracking count, wherein, the diffusion information can include a b-value threshold, but the present invention is not limited to above-mentioned examples.

The image acquisition module 120 is configured to acquire a raw diffusion-weighted image, and also acquire a raw T1-weighted image. Generally speaking, the image acquisition module 120 reads the raw diffusion-weighted image and the raw T1-weighted image from the storage module 104 through a default path or a path inputted or specified by the user using the input module 103.

The raw diffusion-weighted image acquired by the image acquisition module 120 is usually in the format of brain imaging data structure (BIDS), and the raw diffusion-weighted image includes one or more data image, and one or more image information, but the present invention is not limited to above-mentioned examples. The image information in the raw diffusion-weighted image contains data in the format of neuroimaging informatics technology initiative (NIfTI).

The data setting module 130 is configured to set image processing data of the raw diffusion-weighted image based on the image information in the raw diffusion-weighted image acquired by the image acquisition module 120. The image processing data set by the data setting module 130 can include, but not limited to, a phase encoding information, an image acquisition parameter, b-value index data, or a multiband factor.

In more detail, the data setting module 130 extracts the phase encoding information based on a tag in the image information, for example, the data setting module 130 can read the data associated with the tag or parameter "PhaseEncodingDirection" from the JSON file of the image information in the format of NIfTI, to acquire the phase encoding information; the data setting module 130 generates the image acquisition parameter based on the acquired phase encoding direction; for example, the data setting module 130 acquires the image acquisition parameter including a data set (including but not limited to a vector) of "010" meaning the phase encoding direction in which the MRI device performs from-posterior-to-anterior scan (PA), acquires the image acquisition parameter including a data set of "0 –1 0" meaning from-anterior-to-posterior scan (AP), acquires the image acquisition parameter including a data set of "1 0 0" meaning from-right-to-left scan (RL), and acquires the image acquisition parameter including a data set of "–1 0 0" meaning from-left-to-right scan (LR). The different MRI devices generating the raw diffusion-weighted images have different echo times and tag parameters, so in some embodiments, the data setting module 130 determines the phase encoding direction of the raw diffusion-weighted image, and calculates an effective echo time to generate the image acquisition parameter based on brand and model number of the MRI device, to prevent the correction result of the magnetic susceptibility distortion from being affected because of wrong input image acquisition parameter. The data setting module 130 determines and calculates the scan sequence and the amount of the data images in the raw diffusion-weighted image for different phase encoding method, to generate b-value index data, based on a tag in the image information. The data setting module 130 determines whether the data images in the raw diffusion-weighted image acquired by the image acquisition module 120 include the reverse B0 image, based on the image acquisition parameter of the acquired phase encoding direction. For example, when the image acquisition parameter of any phase encoding direction contain a set of vectors and elements of the set of vectors at the same position are respectively positive and negative values or are all zero, such as a vectors set of "–1 0 0" and "1 0 0" or a vectors set of "0 –1 0" and "0 1 0", it indicates that the data image includes the reverse B0 image. The data setting module 130 can record an acceleration parameter of the raw diffusion-weighted image generated by the MRI device, to generate the multiband factor.

In some embodiments, in order to prevent the file name of the data image in the raw diffusion-weighted image from being modified accidently, the data setting module 130 also checks whether the file name of the data image is consistent with the phase encoding direction, and the phase encoding direction can be used to rename the name of the data image.

The deviation processing module 140 performs non-deformation processing on the raw diffusion-weighted image and the raw T1-weighted image acquired by the image acquisition module 120, to improve SNR of the raw diffusion-weighted image and the raw T1-weighted image, thereby increasing accuracy of sequential process. For example, the deviation processing module 140 performs ring artifact (such as Gibbs artifact) correction, signal drift correction, and noise removal, and the details will be illustrated in the following paragraphs.

The deviation processing module 140 removes a ring artifact of the raw diffusion-weighted image based on the diffusion information of the processing parameter set acquired by the parameter acquisition module 110 and the image processing data generated by the data setting module 130. The ring artifact of the raw diffusion-weighted image is formed because the MRI device uses Fourier transform to reconstruct MRI signal as the raw diffusion-weighted image.

Similarly, the deviation processing module 140 removes the ring artifact of the raw T1-weighted image acquired by the image acquisition module 120, to generate the result T1-weighted image.

The deviation processing module 140 determines whether the data images in the raw diffusion-weighted image acquired by the image acquisition module 120 include a plurality of B0 images; when determining that the data images in the raw diffusion-weighted image include the plurality of B0 images, the deviation processing module performs a signal drift correction on the raw diffusion-weighted image based on the diffusion information in the processing parameter acquired by the parameter acquisition module 110 the B0 image in the data images, to increase accuracy and reliability of the fiber tracking structure information generated by the fiber tracking module 180 and the weighted brain-connectivity network generated by the map creating module 185. Generally speaking, the deviation processing module 140 performs linear regression on the B0 images generated by the MRI device at different time points, to obtain a linear change value, and adjusts the signal strength of the data images in the raw diffusion-weighted image based on the linear change value, so as to perform the signal drift correction.

It is to be noted that, the signal drift correction is to correct the signal difference between two scans performed by the MRI device. Therefore, the deviation processing module 140 first determines whether the generation time points of the two B0 images are different, performs the signal drift correction only when the two generation time points are different, and does not perform the signal drift correction when the two generation time points are the same. In addition, in some embodiments, the deviation processing module 140 can determine whether to perform the signal drift correction based on whether the processing parameter set acquired by the parameter acquisition module 110 includes the parameter indicating whether to perform the signal drift correction.

The deviation processing module 140 can determine whether the data images have processed by interpolation based on the headers of the data images in the raw diffusion-weighted image acquired by the image acquisition module 120; when the data images have processed by interpolation, the deviation processing module 140 does not remove noise in the raw diffusion-weighted image, to prevent from causing incorrect estimation for the raw diffusion-weighted image because of noise removal when the property of the noise is changed by interpolation process; when the data images in the raw diffusion-weighted image have not processed by interpolation, the deviation processing module 140 removes noise in the raw diffusion-weighted image. Similarly, in order to prevent the property of noise from being changed by other processing or correction, the deviation processing module 140 usually performs the ring artifact removal and signal drift correction after the noise removal process.

The deformation processing module 150 performs deformation process on the raw diffusion-weighted image processed by the deviation processing module 140, to, generate a result diffusion-weighted image that has SNR higher than that of the raw diffusion-weighted image, thereby increasing the accuracy of sequential process. For example, the deviation processing module 140 can perform eddy current correction, motion correction, magnetic susceptibility distortion correction, bias field correction, or voxel size adjustment; the details will be illustrated in the following paragraphs.

The deformation processing module 150 corrects off-resonance field (such as eddy current artifact) in the raw diffusion-weighted image caused by magnetic susceptibility and eddy, and corrects image distortion in the raw diffusion-weighted image caused by head motion of the scanned target, based on the diffusion information in the processing parameter acquired by the parameter acquisition module 110, so as to generate a result diffusion-weighted image. Because the cost time of the eddy current artifacts correction and head motion correction is longer, in some embodiments, the deformation processing module 150 determines whether to use GPU (CUDA) to accelerate the eddy current artifacts and head motion correction based on the data indicating whether to accelerate the movement correction in the image processing data generated by the data setting module 130, thereby improving process efficiency.

When the data setting module 130 determines that the raw diffusion-weighted image includes the reverse B0 images, the deformation processing module 150 corrects the magnetic susceptibility distortion of the raw diffusion-weighted image processed by the deviation processing module 140, based on the image acquisition parameter set by the data setting module 130, so as to prevent distortion deformation of the diffusion-weighted image. For example, FIG. 5 shows the diffusion-weighted image 510 that is processed with magnetic susceptibility distortion by the deformation processing module 150 under a condition that the image acquisition parameters of the phase encoding directions of the data images in the raw diffusion-weighted image recorded in the image acquisition parameter set by the data setting module 130 are "0 −1 0" and "0 1 0"; however, in a condition that the image acquisition parameter is inputted by a user and not set and generated by the data setting module 130, when the user mistakenly inputs the image acquisition parameter of the phase encoding direction as "−1 0 0" and "0 1 0", the diffusion-weighted image 520 processed with magnetic susceptibility distortion by deformation processing module 150 is not only uncorrected, but also has noise 521 and artifact 522.

The deformation processing module 150 also corrects the bias field of the raw diffusion-weighted image processed by the deviation processing module 140. For example, the deformation processing module 150 can reduce strength of the signal of outside of brain near the MRI device, and enhance strength of the signal of inner side of the brain far away the MRI device. In some embodiments, the deformation processing module 150 also determine whether to perform the bias field correction based on the data indicating whether to correct bias field in the processing parameter set acquired by the parameter acquisition module 110. In some embodiments, the deformation processing module 150 also corrects the bias field of the result T1-weighted image generated by the deviation processing module 140.

The deformation processing module 150 adjusts the voxel size of the raw diffusion-weighted image processed by the deviation processing module 140. In more detail, the deformation processing module 150 can determine whether the voxel adjustment value in the processing parameter set acquired by the parameter acquisition module 110 is the same as the voxel size of the diffusion-weighted image being processed currently; if yes, the deformation processing module 150 does not adjust the voxel size of the diffusion-weighted image; otherwise, the deformation processing module 150 adjusts the voxel size of the diffusion-weighted image, which is being processed currently, to be the same as the voxel adjustment value in the processing parameter set.

The signal processing module 160 is configured to remove a skull in the result T1-weighted image generated by the deviation processing module 140 and divide tissues in the result T1-weighted image to generate a final T1 weighted processed image. For example, the signal processing module 160 uses a function antsBrainExtraction( ) in the utility called "ANTs" to generate a brain extraction mask with an OASIS template, the brain extraction mask includes an anatomical template, a probability mask and a brain extraction registration mask, so that the brain extraction mask can be used to remove the skull in the result T1-weighted image.

The signal processing module 160 is configured to align the generated final T1 weighted processed image to the raw diffusion-weighted image acquired by the image acquisition module 120, to generate a T1-weighted image binary mask.

The indicator generating module 170 is configured to extract the T1-weighted image binary mask generated by the signal processing module 160 and a part, having a lower b value, of the result diffusion-weighted image generated by the deformation processing module 150, and when the lower b value is lower than a b-value threshold (such as 1500 mm$^2$/s) contained in the diffusion information in the processing parameter set acquired by the parameter acquisition module 110, the indicator generating module 170 performs fitting to generate a quantitative indicator of the diffusion tensor image. The quantitative indicator of diffusion tensor can be a plurality of quantitative indicator images, such as diffusion tensor image (DTI) map including tensor model eigenvalues, eigenvectors, or diffusivity coefficients including at least one of fractional anisotropy, mean diffusivity, axial diffusivity, and radial diffusivity.

The fiber tracking module 180 performs calculation on the T1-weighted image binary mask generated by the signal processing module 160 and the result diffusion-weighted image generated by the deformation processing module 150 to generate a fiber tracking structure information through a constrained spherical deconvolution (CSD) model based on the diffusion information and a fiber tracking count in the processing parameter set acquired by the parameter acquisition module 110. For example, the fiber tracking module 180 generates a anatomical information based on the T1-weighted image binary mask generated by the signal processing module 160, and provides the anatomical information as parameter to the CSD model, and the fiber orientation distribution function (fODF) can be reconstructed through the diffusion information (such as the b-value threshold) and the CSD model. The fiber tracking module 180 uses tractography algorithms with anatomical constraints, such as Spherical-deconvolution Informed Filtering of Tractograms (SIFT) function, based on the fiber tracking count in the processing parameter set acquired by the parameter acquisition module 110, and uses the fiber orientation distribution function to generate a fiber tracking structure information to perform brain fiber tracking.

The map creating module 185 aligns the result T1 weighted processed image generated by the deviation processing module 140 to the predetermined brain template defined by the processing parameter set acquired by the parameter acquisition module 110, to generate a target brain template, and also performs brain function partitioning to generate a brain connectivity network matrix to establish a weighted brain-connectivity network based on the generated target brain template and the fiber tracking structure information generated by the fiber tracking module 180. For example, the map creating module 185 selects a second-order integration of the fiber orientation distribution function generated by the fiber tracking module 180, as the tracking algorithm; based on white matter (WM) fiber orientation distribution (FOD) data, the map creating module 185 uses the instruction "tckgen" in the software "MRtrix3" to generate a whole-brain tractogram, and uses a second-order integral tracking algorithm (such as iFOD2) to generate the weighted brain-connectivity network for the fiber orientation distribution generated by the fiber tracking module 180.

The quality management module 190 is configured to read the output data generated by the deviation processing module 140 and the deformation processing module 150, such as a SNR generated by the deviation processing module 140, deformation information outputted from the deformation processing module 150, head motion information, or signal drift information. The quality management module 190 determines the wrong data of the raw diffusion-weighted image that is generated after being processed by the deviation processing module 140 and the deformation processing module 150, based on the diffusion information acquired by the parameter acquisition module 110, so as to generate a quality management report corresponding to the raw diffusion-weighted image and including the output data and the wrong data generated by the above-mentioned modules. Similarly, the quality management module 190 can read the output data generated by the indicator generating module 170 and the fiber tracking module 180, for example, the output data can be the quantization parameter outputted by the indicator generating module 170, or the fiber orientation distribution outputted by the fiber tracking module 180; the quality management module 190 can determine the wrong data generated by the indicator generating module 170 and/or the fiber tracking module 180, to generate the quality management report. The quality management module 190 can store the quality management report into the storage module 104 and/or provide the quality management report to the display module 105 for display the quality management report.

FIG. 6A and FIG. 6B show the quality management report generated by the quality management module 190. As shown in FIG. 6A, the part (A) shows the suggestion message 610 which can be used for quick inspection, the suggestion message includes a summary of outliers, a suggestion for the data images in the raw diffusion-weighted image, a suggestion for the non-deformation processing and deformation processing for the raw diffusion-weighted image, and a suggestion for post-processing of the result diffusion-weighted image; in a practical example, after the deformation processing module 150 corrects the head motion of the scanned object and determines that the head motion (such as rotation or displacement) of the scanned object is greater than a predetermined value (such as 4 standard deviations) in the data images, the deformation processing module 150 determines that the data images have an outlier and generates an outlier prompt; for example, the suggestion message 610 can include an outlier prompt for the 11th, 21st, 37th, 40th, and 53rd data images. Part (B) shows a diffusion-encoded-color (DEC) map 620 which can be used to observe the artifact generated by slight vibration occurred during scanning of the MRI device. Part (C) shows a sum-squared error (SSE) map 630 which can be used to observe chemical shift artifact, so that a user can determine whether the diffusion-weighted image has an outlier through the diffusion-encoded-color map 620 and the sum-squared error (SSE) map 630. In addition, the quality management report can also include diffusion-weighted images for comparison before and after noise removal, ring artifact removal, signal drift correction, b vector re-orientation, or bias filed correct. Similarly, the quality management report can also include the T1 weighted images before and after ring artifact removal and offset correction, that is, the quality management report can include the T1-weighted image binary mask images before and after brain extraction.

As shown in FIG. 6B, the part (A) shows the result diffusion-weighted image 650 (that is, the diffusion-weighted images after pre-process), the part (B) shows the DTI quantitative indicator (that is, a diffusion tensor imaging map 660) generated by DTI fitting process, the part (C) shows the fiber tracking structure information 670 generated by nerve reconstruction through the CSD model, the part (D) shows the brain functional partition image 680 with function partitioning applied with a brain template, and part (E) shows a brain-connectivity network matrix representing a weighted brain-connectivity network, and the brain-connectivity network matrix includes mean stream lengths 691, weighted streamline counts 693, and weighted streamline counts scaled by proportionality coefficients 695.

The operation of the system and method of the present invention will be described according to an embodiment. Please refer to FIG. 2, FIG. 2 is a flowchart of a method of generating data from diffusion-weighted images for pre-processing, according to the present invention. The method includes the following steps.

In a step 201, the parameter acquisition module 110 acquires a processing parameter set. In this embodiment, the parameter acquisition module 110 reads processing parameters including an image scanning sequence, data indicating whether to correct signal drift, data indicating whether to accelerate movement correction, voxel adjustment value, diffusion information, brain template storage path, data indicating whether to bias field correction, or fiber tracking count, from a preset profile or a profile edited by a user. The diffusion information can include a b-value threshold.

After the parameter acquisition module acquires the processing parameter set (the step 201), the image acquisition module 120 acquires the raw diffusion-weighted image including a data image and image information in a step 210. In this embodiment, the raw diffusion-weighted image is in the format of BIDS, the data image is stored as a NIfTI file and the image information is stored as a JSON file.

After the image acquisition module 120 acquires the raw diffusion-weighted image (the step 210), the data setting module 130 sets the image processing data of the raw diffusion-weighted image, based on the image information in the raw diffusion-weighted image acquired by the image acquisition module 120, in a step 220. In this embodiment, in a condition that the image processing data generated by the data setting module 130 includes a phase encoding information, an image acquisition parameter, b-value index data, or a multi-band factor. For example, the data setting module 130 reads a PhaseEncodingDirection tag or a parameter of JSON file to acquire an image acquisition parameter including a vector (data set) of "0 1 0" meaning the phase encoding direction in which the MRI device performs from-posterior-to-anterior scan (PA), an image acquisition parameter including a vector of "0 –1 0" meaning from-anterior-to-posterior scan (AP), an image acquisition parameter including a vector of "1 0 0" meaning from-right-to-left scan (RL), and an image acquisition parameter including a vector of "–1 0 0" meaning from-left-to-right scan (LR); the acquired image acquisition parameter is stored in a file with a name of Acquparams_Topup. The data setting module 130 determines that each of an amount of the images generated in the phase encoding directions of AP (from-anterior-to-posterior) and PA (from-posterior-to-anterior) is four, based on PhaseEncodingOrientation tag or parameter, the machine scan sequence is to scan AP and then scan PA, so that the b-value index data "1 1 1 1 2 2 2 2" is generated and stored in a file with a name of Eddy_index. The data setting module 130 acquires the acceleration parameter of the raw diffusion-weighted image during scanning of the MRI device as a multi-band factor. the generated multi-band factor is stored in a file with a name of MBF; the data setting module 130 stores the other processing data in other file.

After the data setting module 130 sets the image processing data of the raw diffusion-weighted image, the deviation processing module 140 performs non-deformation process on the raw diffusion-weighted image acquired by the image acquisition module 120, based on the diffusion information in the processing parameter set acquired by the parameter acquisition module 110 and the image processing data set by the data setting module 130; for example, the deviation processing module 140 executes the function mrdegibbs( ) in the software "MRtrix3" to remove ring artifact of the raw diffusion-weighted image, executes the linear regression to correct signal drift of the raw diffusion-weighted image, executes the function dwidenoise( ) in MRtrix3 to remove noise of the raw diffusion-weighted image.

In this embodiment, the deviation processing module 140 determines whether the data image in the raw diffusion-weighted image has been processed by interpolation, based on the image information (such as a tag in a JSON file) in the raw diffusion-weighted image; if yes, the deviation processing module 140 does not execute the noise removing operation for the raw diffusion-weighted image; otherwise, when the data image in the raw diffusion-weighted image is not processed by interpolation, the deviation processing module 140 removes noise in the raw diffusion-weighted image. Next, in a step 230, the deviation processing module 140 removes ring artifact of the raw diffusion-weighted image based on the diffusion information and the image processing data. In a step 250, after the ring artifact removal is completed, when the deviation processing module 140 determine whether that the data indicating whether to correct signal drift in the processing parameter is set, the deviation processing module 140 determines whether the data image in the raw diffusion-weighted image includes a plurality of B0 images. In a step 260, when the data image of the raw diffusion-weighted image includes a plurality of B0 images, the deviation processing module 140 uses the linear regression to perform signal drift correction on the raw diffusion-weighted image based on the b-value threshold contained in the diffusion information and the plurality of B0 images; otherwise, the deviation processing module 140 does not perform the signal drift correction.

After the deviation processing module 140 performs non-deformation processing on the raw diffusion-weighted image acquired by the image acquisition module 120, the deformation processing module 150 performs deformation processing on the raw diffusion-weighted image processed through the deviation processing module 140, to generate the result diffusion-weighted image. For example, the deformation processing includes eddy current correction, motion correction, magnetic susceptibility distortion correction, bias field correction, voxel size adjustment.

In this embodiment, the data setting module 130 can set the image processing data of the raw diffusion-weighted image and also determine whether the data image in the raw diffusion-weighted image acquired by the image acquisition module 120 includes the reverse B0 image; if the data image does not include the reverse B0 image, the deformation processing module 150 does not perform the magnetic susceptibility distortion correction on the raw diffusion-weighted image; when the data image in the raw diffusion-weighted image includes the reverse B0 image, the deformation processing module 150 uses the image acquisition parameter set by the data setting module 130 as the parameter, uses the function Topup( ) in the software "FSL" to perform magnetic susceptibility distortion correction on the raw diffusion-weighted image processed through the deviation processing module 140. Next, in a step 280, the deformation processing module 150 uses diffusion information in the processing parameter acquired by the parameter acquisition module 110 as parameter, uses the function eddy( ) in FSL, corrects the eddy current artifacts and head motion of the raw diffusion-weighted image processed though the deviation processing module 140. After the eddy current artifacts and head motion correction are performed and the deformation processing module 150 determines that the data indicating whether to correct the bias field in the processing parameter set is set, the deformation processing module 150 uses the function dwibiascorrect( ) in the software "MRtrix3" and N4ITK algorithm to correct the bias field of the diffusion-weighted image which has processed with eddy current artifacts and head motion correction; when the data indicating whether to correct the bias field is not set, the deviation processing module 140 does not perform the bias field correction. The deformation processing module 150 then determines whether the voxel adjustment value in the processing parameter set is 0, if yes, the deformation processing module 150 does not adjust the voxel size of the corrected raw diffusion-weighted image; otherwise, the deformation processing module 150 adjusts the voxel of the corrected raw diffusion-weighted image, so that the voxel size of the adjusted raw diffusion-weighted image is the same as the voxel adjustment value.

As a result, with the above-mentioned solution of the present invention, the user can complete the pre-processing on the diffusion-weighted image without setting the processing parameter manually, so that the SNR of the processed diffusion-weighted image (that is, the result diffusion-weighted image) can be improved, and the accuracy and reliability of the processed diffusion-weighted image can be increased.

In above-mentioned embodiment, when the present invention includes the signal processing module 160, the method can include following steps before, while, or after the raw diffusion-weighted image is processed, as shown in FIG. 3. In step 310, the image acquisition module 120 acquires a raw T1-weighted image; in a step 330, the deviation processing module 140 executes the function mrdegibbs( ) in the software "MRtrix3" to remove the ring artifact of the raw T1-weighted image acquired by the image acquisition module 120, to generate result T1-weighted image; the deformation processing module 150 can execute the instruction "N4BiasFieldCorrection" in the utility "ANTs" to correct the T1 weighted image in which ring artifact is removed. In a step 350, the signal processing module 160 removes a skull in the result T1-weighted image, and divides tissues in the result T1-weighted image to generate a final T1 weighted processed image.

In a step 370, the signal processing module 160 determines whether to align the generated final T1 weighted processed image to the raw diffusion-weighted image acquired by the image acquisition module 120, to generate a T1-weighted image binary mask based on the user's setting. For example, the signal processing module 160 can use the function antsBrainExtraction( ) in the utility "ANTs" to generate a brain extraction mask, and use the function 5ttgen( ) in the software "MRtrix3" to generate divide images with five tissue types. The signal processing module 160 uses the function FLIRT( ) in the software "FSL" to perform registration on the result diffusion-weighted image and the T1 weighted image based on boundary, so as to generate a T1-weighted image binary mask.

When the above-mentioned embodiment includes the indicator generating module 170, the above-mentioned embodiment can include the following steps. As shown in FIG. 4A, in a step 410, the indicator generating module 170 extracts the T1-weighted image binary mask generated by the signal processing module 160 and a part, having a lower b value, of the result diffusion-weighted image generated by the deformation processing module 150, based on the diffusion information in the processing parameter acquired by the parameter acquisition module 110; in a step 420, the indicator generating module 170 performs a fitting process to extract the lower-b-vale part, so as to generate a quantitative indicator of the diffusion tensor image. When the b-value threshold contained in the diffusion information is 1500 s/mm2, the indicator generating module 170 uses the diffusion tensor model and the instruction "dtifit" in the software "FSL" to extract and analyze a part of the result diffusion-weighted image that has a b value lower than the b-value threshold, so as to generate DTI maps.

When the above-mentioned embodiment includes the fiber tracking module 180, the above-mentioned embodiment can include the following step. As shown in FIG. 4B, in a step 450, based on the b-value threshold and fiber tracking count contained in the diffusion information of the processing parameter set acquired by the parameter acquisition module 110, the fiber tracking module 180 uses the constrained spherical deconvolution (CSD) model to perform calculation on the T1-weighted image binary mask generated by the signal processing module 160 and the result diffusion-weighted image generated by the deformation processing module 150, to generate a fiber tracking structure information. For example, the fiber tracking module 180 uses the function dwi2response ( ) in the software "MRtrix3" to calculate tissues of white matter, gray matter (GM), and cerebrospinal fluid (CSF), uses the function dwi2fod( ) in MRtrix3 and CSD algorithm to estimate FOD, and uses the instruction "mtnormalise" in MRtrix3 to standardize intensities of generated tissue components, so as to quantify the tissue components in different diffusion-weighted images; next, the fiber tracking module 180 uses the instruction "tckgen" in MRtrix3 on fiber orientation distribution of white matter to generate a whole-brain tractogram, uses the second-order integration over fiber orientation distribution (iFOD2) tracking algorithm to generate a whole-brain nerve fiber tracking image.

When the present invention includes the map creating module 185, the above-mentioned embodiment can include the following steps. As shown in FIG. 4C, in a step 470, the map creating module 185 aligns the result T1 weighted processed image generated by the deviation processing module 140 to the predetermined brain template defined by the processing parameter set acquired by the parameter acquisition module 110, to generate a target brain template; in a step 480, the map creating module 185 creates a weighted brain-connectivity network, based on the target brain template and the fiber tracking structure information generated by the fiber tracking module 180.

According to above-mentioned contents, the difference between the present invention and the conventional technology is that, in the present invention, the processing parameter set including diffusion information is acquired; after the raw diffusion-weighted image including data images and image information is acquired, the image information is interpreted to set image processing data of the raw diffusion-weighted image, and non-deformation correction and deformation correction are performed on the raw diffusion-weighted image to generate the pre-processed diffusion-weighted image based on the processing parameter set and the image processing data. Therefore, the above-mentioned solution of the present invention is able to solve the conventional problem that the technical threshold of diffusion-weighted image pre-processing is high and the image processing data may be wrongly inputted, so as to achieve the effect of lowering threshold for data analysis and saving setup time of image processing data.

According to the present invention, the method of generating data from diffusion-weighted images for pre-processing can be implemented by hardware, software or a combination thereof, and can be implemented in a computer system by a centralization manner, or by a distribution manner of different components distributed in several interconnect computer systems.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A method of generating data from diffusion-weighted images for pre-processing, wherein the method comprises:
   acquiring a processing parameter set by a device, wherein the processing parameter set comprises diffusion information;

acquiring a raw diffusion-weighted image (DWI) by the device, wherein the raw diffusion-weighted image comprises data images and an image information;

setting image processing data of the raw diffusion-weighted image based on the image information by the device;

performing following steps on the raw diffusion-weighted image to generate a result diffusion-weighted image:

removing ring artifact of the raw diffusion-weighted image based on the diffusion information and the image processing data by the device;

when the device determines the data images comprise B0 images, performing a signal drift correction on the raw diffusion-weighted image based on the diffusion information and the plurality of B0 images by the device; and correcting eddy current artifact and a head motion in the raw diffusion-weighted image based on the diffusion information and the image processing data by the device acquiring a raw T1-weighted image by the device;

removing ring artifact of the raw T1-weighted image, to generate a result T1-weighted image, by the device;

removing a skull in the result T1-weighted image and dividing tissues in the result T1-weighted image to generate a final T1 weighted processed image by the device; and aligning the final T1 weighted processed image to the raw diffusion-weighted image to generate a T1-weighted image binary mask by the device;

using a fiber orientation distribution function to perform calculation on the T1-weighted image binary mask and the result diffusion-weighted image to generate a fiber tracking structure information based on the diffusion information and a fiber tracking count defined by the processing parameter set by the device;

aligning the result T1 weighted processed image to a predetermined brain template defined by the processing parameter set, to generate a target brain template, by the device; and creating a weighted brain-connectivity network based on the target brain template and the fiber tracking structure information by the device.

2. The method of generating data from diffusion-weighted images for pre-processing according to claim 1, further comprising:

determining wrong data of the raw diffusion-weighted image based on the diffusion information by the device, to generate a quality management report corresponding to the raw diffusion-weighted image.

3. The method of generating data from diffusion-weighted images for pre-processing according to claim 1, before the device removes the ring artifact of the raw diffusion-weighted image, further comprising:

removing noise in the raw diffusion-weighted image by the device when the device determines that the data images are not processed by interpolation based on the image information.

4. The method of generating data from diffusion-weighted images for pre-processing according to claim 1, after the device removes the ring artifact of the raw diffusion-weighted image, further comprises:

correcting a magnetic susceptibility distortion in the raw diffusion-weighted image by the device when the device determines the data images comprise a reverse B0 image.

5. The method of generating data from diffusion-weighted images for pre-processing according to claim 1, after the device corrects the ring artifact and head motion of the raw diffusion-weighted image, further comprises:

correcting a bias field in the raw diffusion-weighted image by the device.

6. The method of generating data from diffusion-weighted images for pre-processing according to claim 1, after the device corrects the ring artifact and head motion of the raw diffusion-weighted image, further comprises:

adjusting a voxel size of the raw diffusion-weighted image by the device.

7. The method of generating data from diffusion-weighted images for pre-processing according to claim 1, after the device generates the T1-weighted image binary mask, further comprising:

extracting a T1-weighted image binary mask to fit with a part, with a lower b value, of the result diffusion-weighted image to generate a quantitative indicator of a diffusion tensor image (DTI) based on a b-value threshold of the diffusion information by the device.

8. The system of generating data from diffusion-weighted images for pre-processing, implemented by at least one device, wherein the system comprises:

a memory module, configured to store at least one computer readable instruction; and a processing module, connected to the storage module, configured to execute the at least one computer readable instruction to generate following modules:

a parameter acquisition module, configured to acquire a processing parameter set, wherein the processing parameter set comprises diffusion information and defines a fiber tracking count and a predetermined brain template;

an image acquisition module, configured to acquire a raw diffusion-weighted image and a raw T1-weighted image, wherein the raw diffusion-weighted image comprises data images and an image information;

a data setting module, configured to set image processing data of the raw diffusion-weighted image based on the image information;

a deviation processing module, configured to remove ring artifact of the raw diffusion-weighted image based on the diffusion information and the image processing data, perform a signal drift correction on the raw diffusion-weighted image based on the diffusion information and a plurality of B0 images comprised in the data images, and remove ring artifact of the raw T1-weighted image to generate a result T1-weighted image;

a deformation processing module, configured to correct eddy current artifacts and head motion of the raw diffusion-weighted image processed by the deviation processing module, based on the b-value threshold and the image processing data a signal processing module, configured to remove a skull in a result T1-weighted image and divide tissues in the result T1-weighted image to generate a final T1 weighted processed image, and align the final T1 weighted processed image to the raw diffusion-weighted image to generate a T1-weighted image binary mask;

a fiber tracking module, configured to use a fiber orientation distribution function to perform calculation on the T1-weighted image binary mask and the result diffusion-weighted image to generate a fiber tracking structure information based on the diffusion information and the fiber tracking count; and a map creating module, configured to align the result T1 weighted processed image to the predetermined brain template to generate a target brain template, and create a weighted brain-connectivity network based on the target brain template and the fiber tracking structure information.

9. The system of generating data from diffusion-weighted images for pre-processing according to claim 8, wherein the processing module is configured to generate a quality management module, the quality management module is configured to determine wrong data of the raw diffusion-weighted image based on the diffusion information, to generate a quality management report corresponding to the raw diffusion-weighted image.

10. The system of generating data from diffusion-weighted images for pre-processing according to claim 8, wherein the data setting module is configured to determine whether the data images comprise reverse B0 image, and the deformation processing module is configured to correct a magnetic susceptibility distortion in the raw diffusion-weighted image when the data images comprise at least one reverse B0 image.

11. The system of generating data from diffusion-weighted images for pre-processing according to claim 8, wherein the deviation processing module is configured to remove noise in the raw diffusion-weighted image based on the image information.

12. The system of generating data from diffusion-weighted images for pre-processing according to claim 8, wherein the deformation processing module is configured to correct a bias field in the raw diffusion-weighted image.

13. The system of generating data from diffusion-weighted images for pre-processing according to claim 8, wherein the deformation processing module is configured to adjust a voxel size of the raw diffusion-weighted image.

14. The system of generating data from diffusion-weighted images for pre-processing according to claim 8, wherein the processing module is configured to generate an indicator generating module, the indicator generating module is configured to extract a T1-weighted image binary mask to fit with a part, with a lower b value, of the result diffusion-weighted image to generate a quantitative indicator of a diffusion tensor image based on a b-value threshold of the diffusion information.

* * * * *